(12) United States Patent
Lu et al.

(10) Patent No.: US 8,984,270 B2
(45) Date of Patent: Mar. 17, 2015

(54) DATA FILE DECRYPTION METHOD, DECRYPTION DEVICE AND DATA BROADCASTING SYSTEM

(75) Inventors: Xiaoming Lu, Beijing (CN); Jingyu Dong, Beijing (CN); Huiyuan Zhang, Beijing (CN); Yong Li, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 843 days.

(21) Appl. No.: 13/139,446

(22) PCT Filed: Dec. 15, 2009

(86) PCT No.: PCT/CN2009/001458
§ 371 (c)(1),
(2), (4) Date: Aug. 1, 2011

(87) PCT Pub. No.: WO2010/069134
PCT Pub. Date: Jun. 24, 2010

(65) Prior Publication Data
US 2012/0137122 A1    May 31, 2012

(30) Foreign Application Priority Data

Dec. 15, 2008  (CN) .......................... 2008 1 0239928
Apr. 22, 2009  (CN) .......................... 2009 1 0135609

(51) Int. Cl.
*H04L 29/06* (2006.01)
*H04L 9/08* (2006.01)
*H04N 21/266* (2011.01)
*H04N 21/2362* (2011.01)
*H04N 21/854* (2011.01)

(52) U.S. Cl.
CPC ............ *H04L 9/0861* (2013.01); *H04L 9/0819* (2013.01); *H04N 21/26613* (2013.01); *H04N 21/2362* (2013.01); *H04N 21/85406* (2013.01); *H04L 63/0428* (2013.01); *H04L 63/06* (2013.01); *H04L 2209/601* (2013.01)
USPC .......................................................... 713/150

(58) Field of Classification Search
None
See application file for complete search history.

(56) References Cited

U.S. PATENT DOCUMENTS

2005/0172123 A1    8/2005  Carpentier et al.
2005/0223224 A1*  10/2005  Carpentier et al. ........... 713/165
2006/0021066 A1*   1/2006  Clayton et al. .................. 726/28

FOREIGN PATENT DOCUMENTS

| CN | 101 296 246 | 9/2007 |
| CN | 101 515 830 | 8/2009 |
| WO | 2008/129471 | 10/2008 |

*Primary Examiner* — Brandon Hoffman
(74) *Attorney, Agent, or Firm* — Fay Kaplun & Marcin, LLP

(57) ABSTRACT

A data file decryption method, a decryption device and a data broadcasting system are disclosed, which are applied to a data broadcasting service. Among them, the data file decryption method includes the steps of: receiving the file delivery information which includes a data file identification and a key file identification corresponding to the data file; receiving the corresponding data file and key file according to the data file identification and the key file identification; and decrypting the data file according to the key file. According to the data file decryption method, decryption device and the data broadcasting system of the present invention, by setting the data file identification and the corresponding key file identification in the file delivery information and receiving the corresponding file according to the data file identification and the key file identification, the resource dissipation due to a large quantity of useless information received at a terminal is avoided, and the file to be received can be quickly located by the terminal, so that the time delay due to the decryption of a data file is avoided, and the service experience for users is improved.

6 Claims, 7 Drawing Sheets

DATA FILE DECRYPTION METHOD, DECRYPTION DEVICE AND DATA BROADCASTING SYSTEM

The present application claims priorities to Chinese Patent Application No. 200810239928.X, filed with the Chinese Patent Office on Dec. 15, 2008 and entitled "METHOD AND DEVICE FOR DECRYPTING DATA FILE AND DATA BROADCAST SYSTEM", and Chinese Patent Application No. 200910135609.9, filed with the Chinese Patent Office on Apr. 29, 2009 and entitled "METHOD AND DEVICE FOR DECRYPTING DATA FILE AND DATA BROADCAST SYSTEM", the entire disclosure of these patents/applications are expressly incorporated herein by reference.

FIELD OF THE INVENTION

The present invention relates to the field of data broadcast and particularly to a method and device for decrypting a data file and a data broadcast system.

BACKGROUND OF THE INVENTION

A File Delivery Table (FDT) file typically carried in a data stream in the art of data broadcast carries description information and Transport Object Identifiers (TOI) of respective files transmitted in the data stream, where a TOI identifies uniquely a file in a session. During reception of data files, a user equipment firstly receives and searches the file delivery table for a data file to be received and retrieves the TOI of the data file, and then receives IP packets from the broadcast stream according to the TOI and encapsulates them into a file.

In some data broadcast services, a broadcast data file is encrypted to secure the services, and the data file and a key file carrying a key are transmitted to a user. In order to enable a user equipment to retrieve the key to decrypt the data file upon reception of data broadcast, a mechanism is required in the data broadcast service to associate the data file and the key file carrying the key.

In view of this issue, an existing solution to a Multimedia Broadcast Multicast Service MBMS is as follows.

A data file in the MBMS service is encapsulated in the format of an OMA DRM DCF file, and an identifier of a key to decrypt the file is carried in a specific field (e.g., RightIssuerURL) of the DCF file. The key encrypting the file is encapsulated into a separate key file in the format of an MIKEY message, and an identifier of the encrypting key is carried in a specific field of the MIKEY message. The key file and the encrypted data file are transmitted in the same FLUTE stream.

A user equipment receives a data file in the following specific operations: 1. it firstly searches a file delivery table for a desired data file, retrieves a TOI value of the file and receives the data file according to the TOT value; 2. the user equipment parses the data file upon reception thereof and extracts a key identifier from the file; and 3. the user equipment receives all of key files, parses each of them, extracts a key identifier and a key therefrom and compares the key identifier with that in the data file, and if they are consistent, then it decrypts the data file using the key; otherwise, it continues with receiving a next key file.

In the prior art, a user equipment intended to receive only a specific data file has to receive all of key files and parses each of them until a corresponding key is retrieved and consequently has to receive a large amount of useless information and has its resource wasted; and also the user equipment fails to locate a desired key file rapidly and thus performs slow reception, a user's experience of a service may be degraded.

SUMMARY OF THE INVENTION

In order to address the drawbacks in the prior art that a user equipment has to receive a large amount of useless information and has its resource wasted and reception speed degraded, a first object of the invention is to provide a device for generating file description information, which can enable the user equipment to obviate reception of a large amount of useless information and locate a data file and a corresponding key file rapidly.

In order to address the drawbacks in the prior art that a user equipment has to receive a large amount of useless information and has its resource wasted and reception speed degraded, a second object of the invention is to provide a method for decrypting a data file, which can enable the user equipment to obviate reception of a large amount of useless information and locate a data file and a corresponding key file rapidly.

In order to address the drawbacks in the prior art that a user equipment has to receive a large amount of useless information and has its resource wasted and reception speed degraded, a third object of the invention is to provide a device for decrypting a data file, which can enable the user equipment to obviate reception of a large amount of useless information and locate a data file and a corresponding key file rapidly.

In order to address the drawbacks in the prior art that a user equipment has to receive a large amount of useless information and has its resource wasted and reception speed degraded, a third object of the invention is to provide a data broadcast system which can enable the user equipment to obviate reception of a large amount of useless information and locate a data file and a corresponding key file rapidly.

To attain the first object, the invention provides a device for generating file description information, which includes: a data description information generation module configured to generate an identifier of a data file; a key description information generation module configured to generate an identifier of a key file to decrypt the data file; and a file description information generation module configured to generate file description information according to the identifier of the data file and the identifier of the key file.

To attain the second object, the invention provides a method for decrypting a data file, which includes: receiving file description information including an identifier of a data file and an identifier of a key file corresponding to the data file; receiving the data file and key file according to the identifier of the data file and the identifier of the key file; and decrypting the data file according to the key file.

To attain the second object, the invention further provides a method for decrypting a data file, which includes: receiving file description information including a transport object identifier of a data file and a content location identifier of a key file to decrypt the data file; searching the file description information for a transport object identifier of the key file according to the content location identifier of the key file; receiving the data file and key file according to the transport object identifier of the data file and the transport object identifier of the key file; and decrypting the data file according to the key file.

To attain the third object, the invention provides a device for decrypting a data file, which includes: a file identifier reception module configured to receive an identifier of a data file and an identifier of a corresponding key file to be retrieved from file description information; a file reception module configured to receive the data file and key file according to the identifier of the data file and the identifier of the key file; and a decryption module configured to decrypt the data file according to the key file.

To attain the fourth object, the invention provides a data broadcast system including: a description information generation device configured to generate file description information including an identifier of a data file and an identifier of a key file corresponding to the data file; and a data file decryption device configured to receive the identifier of the data file and the identifier of the key file in the file description information, to receive the data file and key file according to the identifier of the data file and the identifier of the key file, and to decrypt the data file according to the key file.

The device for generating file description information, the method and device for decrypting a data file and the data broadcast system according to the invention set the identifier of the data file and the identifier of a corresponding key file in the file description information and receive the corresponding files according to the data file identifier and the key file identifier so that the user equipment can obviate a waste of resource due to reception of a large amount of useless information and locate rapidly the file to be received to thereby obviate a time delay due to decryption of the data file and improve a user's experience of a service.

DETAILED DESCRIPTION OF THE EMBODIMENTS

The invention will be detailed hereinafter with reference to the drawings.

Figure 1:
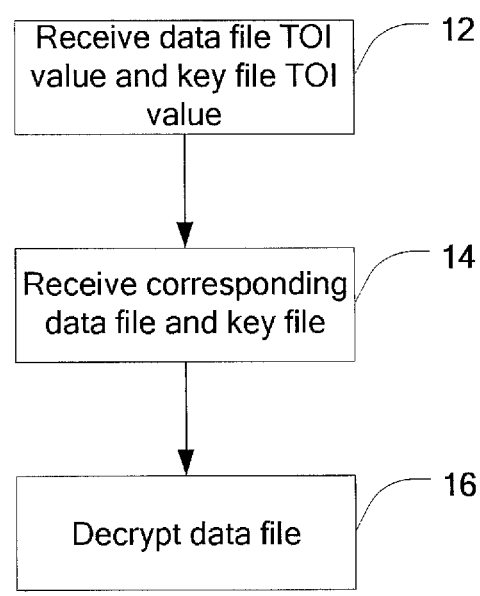
FIG. 1 illustrates a flow chart of a method for decrypting a data file according to a first embodiment of the invention.

As illustrated in FIG. 1, a method for decrypting a data file according to a first embodiment of the invention can be applicable in data broadcast services, e.g., an MBMS service, etc., and particularly includes the following operations 12-16.

In the operation 12, a user equipment receives a TOI value of a data file and a TOI value of a key file to decrypt the data file in an FDT;

In the operation 14, the corresponding data file and key file are received according to the TOI value of the data file and the TOI value of the key file; and In the operation 16, the data file is decrypted according to the key file.

Each key file may include one key for decrypting a corresponding data file.

When the key file includes a plurality of keys, the data file including a key identifier is parsed to retrieve the corresponding key identifier, then corresponding one of the keys is extracted from the key file according to the key identifier, and next the data file is decrypted with the key.

Figure 2:
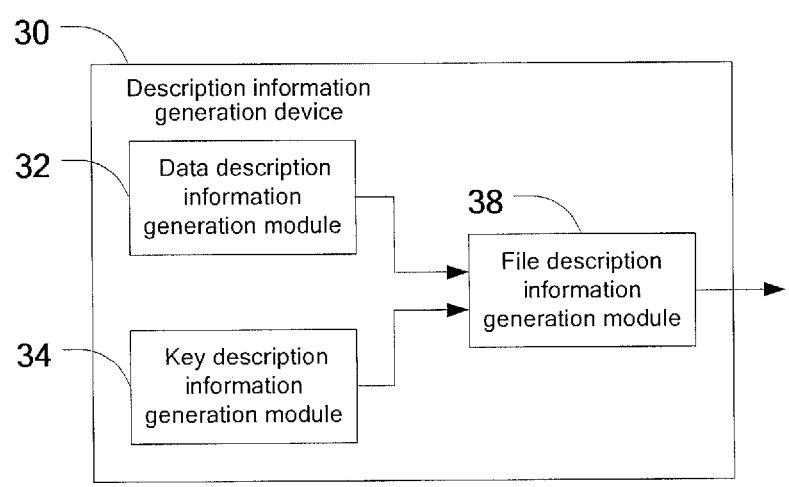
FIG. 2 illustrates a diagram of the structure of a device for generating description information according to the first embodiment of the invention.

As illustrated in FIG. 2, a device 30 for generating description information according to the first embodiment of the invention includes: a data description information generation module 32 configured to generate description information of a data file, which includes a data file TOI value; a key description information generation module 34 configured to generate description information of a key file to decrypt the data file, which includes a key file TOI value; and a file description information generation module 38 configured to generate an FDT file according to the data file TOI value and the key file TOI value.

Taking MBMS as an example, the device for generating description information resides in a content distribution server and generates the FDT file as shown below:

```
<FDT-Instance>
    <File
        Content-Type="application/sdp"
        Content-Length="7543"
        Transfer-Length="4294"
        TOI="2"
        KEY_FILE_TOI="8"
        FEC-OTI-Encoding-Symbol-Length="16"
        FEC-OTI-Scheme-Specific-Info="AAEBBA=="
Content-Location="http://www.example.com/fancy-session/main.sdp">
        <MBMS-Session-Identity>93</MBMS-Session-Identity>
    </File>
    <File
        Content-Type="String"
        Content-Length="161934"
        Transfer-Length="157821"
        TOI="3"
        KEY_FILE_TOI="9"
        FEC-OTI-Encoding-Symbol-Length="512"
Content-Location="http://www.example.com/fancy-session/trailer.3gp">
        <MBMS-Session-Identity>93</MBMS-Session-Identity>
    </File>
</FDT-Instance>
```

Particularly, "KEY_FILE_TOI="8"" and "KEY_FILE_TOI="9"" are newly added statements descriptive of a key file TOI value, where the TOI value of the data file "main.sdp" is 2 and its corresponding key file TOI value is 8, and the TOI value of the data file "trailer.3gp" is 3 and its corresponding key file TOI value is 9.

Figure 3:
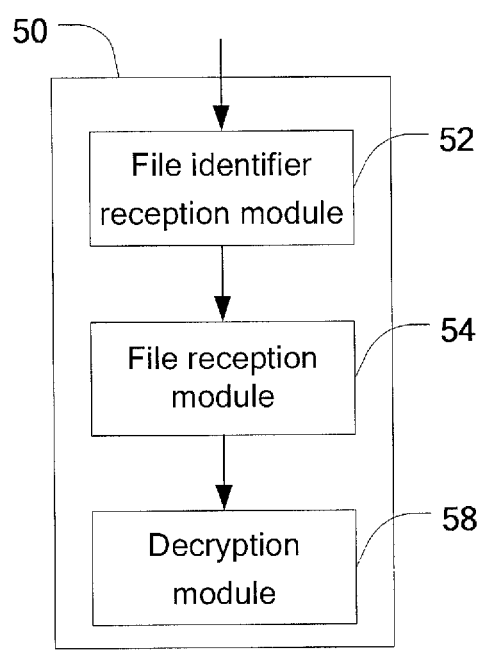
FIG. 3 illustrates a diagram of the structure of a device for decrypting a data file according to the first embodiment of the invention.

As illustrated in FIG. 3, a device 50 for decrypting a data file according to the first embodiment of the invention includes: a file identifier reception module 52 configured to receive a TOI value of a data file and a TOI value of a corresponding key file to be retrieved from a FDT; a file reception module 54 configured to receive the corresponding data file and key file according to the data file TOI value and the key file TOI value; and a decryption module 58 configured to decrypt the data file according to the key file.

In the first embodiment, the data file decryption device 50 resides in a user equipment. The user equipment intended to receive the data file with the TOI value of 2 locates and downloads the data file according to the TOI value and also downloads the key file with the TOI value of 8 corresponding to the data file according to a description in the FDT and decrypts the data file using the key in the key file.

Figure 4:
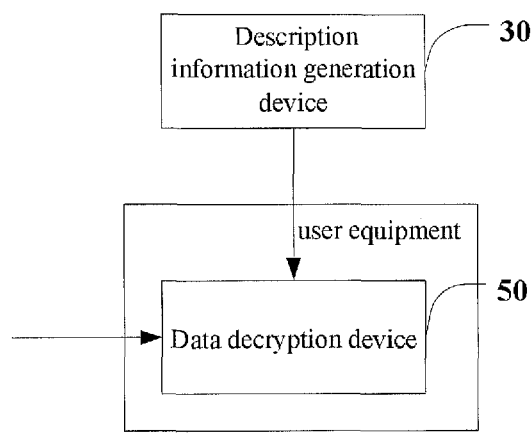
FIG. 4 illustrates a diagram of the structure of a data broadcast system according to the first embodiment of the invention.

As illustrated in FIG. 4, a data broadcast system according to the first embodiment of the invention includes: a description information generation device 30 configured to generate a file description information including an identifier of a data file and an identifier of a key file corresponding to the data file; and a data file decryption device 50 configured to receive the data file identifier and the key file identifier, to receive the corresponding data file and key file according to the data file identifier and the key file identifier, and to decrypt the data file according to the key file. According to the first embodiment of the invention, the TOI value of the data file and the TOI value of the key file to decrypt the data file are carried in the FDT so that the user equipment can receive the data file and the key file rapidly and obviate both a waste of resource due to reception of a large amount of useless information and also a time delay due to decryption of the data file to thereby improve a user's experience of a service.

Figure 5:
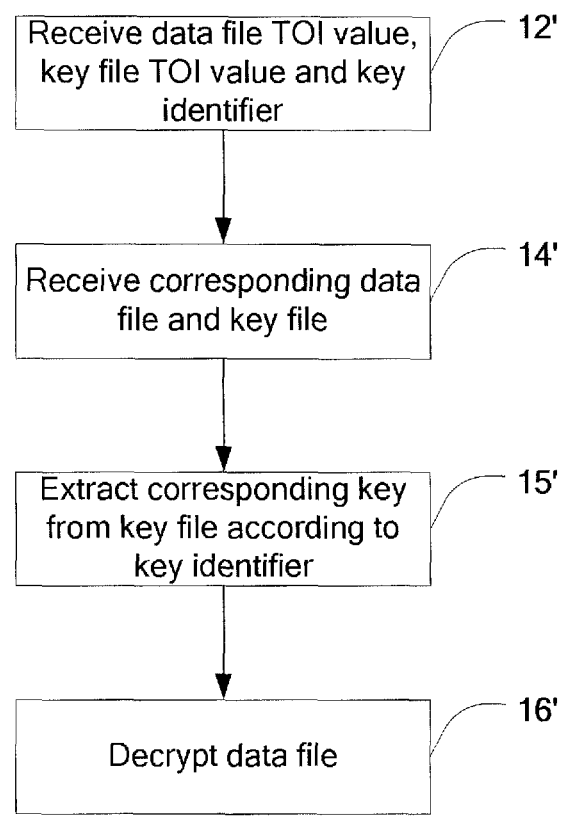
FIG. 5 illustrates a flow chart of a method for decrypting a data file according to a second embodiment of the invention.

As illustrated in FIG. 5, a method for decrypting a data file according to a second embodiment of the invention includes the following operations 12'-16'.

In the operation 12', a user equipment receives a TOI value of a data file, a TOT value of a key file to decrypt the data file and a key identifier corresponding to the data file in an FDT;

In the operation 14', the corresponding data file and key file are received according to the TOI value of the data file and the TOI value of the key file;

In the operation 15', a corresponding key is extracted from the key file according to the key identifier; and In the operation 16', the data file is decrypted according to the key.

Since each key file may include a plurality of keys corresponding to a plurality of data files, the key identifier corresponding to the data file is added in the FDT file. Therefore, the key corresponding to the data file can be located more rapidly without parsing the data file.

Figure 6:
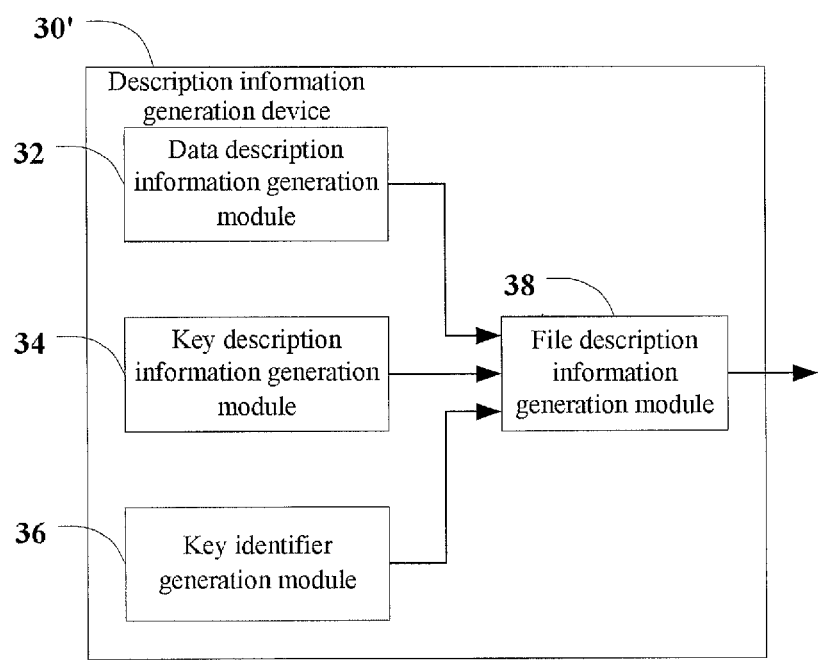
FIG. 6 illustrates a diagram of the structure of a device for generating description information according to the second embodiment of the invention.

As illustrated in FIG. 6, a device 30' for generating description information according to the second embodiment of the invention includes: a data description information generation module 32 configured to generate description information of a data file, which includes a data file TOI value; a key description information generation module 34 configured to generate description information of a key file to decrypt the data file, which includes a key file TOI value; a key identifier generation module 36 configured to generate a key identifier corresponding to the data file; and a file description information generation module 38 configured to generate an FDT file from the data file identifier, the key file identifier and the key identifier.

Also taking MBMS as an example, the device 30' for generating description information resides in a content distribution server and generates the FDT file as shown below:

```
<FDT-Instance>
    <File
        Content-Type="application/sdp"
        Content-Length="7543"
        Transfer-Length="4294"
        TOI="2"
        KEY_FILE_TOI="8"
        KEY_ID="BAEE="
        FEC-OTI-Encoding-Symbol-Length="16"
        FEC-OTI-Scheme-Specific-Info="AAEBBA=="
Content-Location="http://www.example.com/fancy-session/main.sdp">
        <MBMS-Session-Identity>93</MBMS-Session-Identity>
    </File>
    <File
        Content-Type="String"
        Content-Length="161934"
```
        Transfer-Length="157821"
        TOI="3"
        KEY_FILE_TOI="9"
    KEY_ID="BAFF="
        FEC-OTI-Encoding-Symbol-Length="512"
Content-Location="http://www.example.com/fancy-session/trailer.3gp">
        <MBMS-Session-Identity>93</MBMS-Session-Identity>
    </File>
</FDT-Instance>
```

Particularly, "KEY_ID="BAFF"=" is a statement in the FDT to describe the key identifier, where the TOI value of the data file "main.sdp" is 2 and the TOI value of a corresponding key file is 8 and a corresponding key identifier is "BAFF=".

Figure 7:
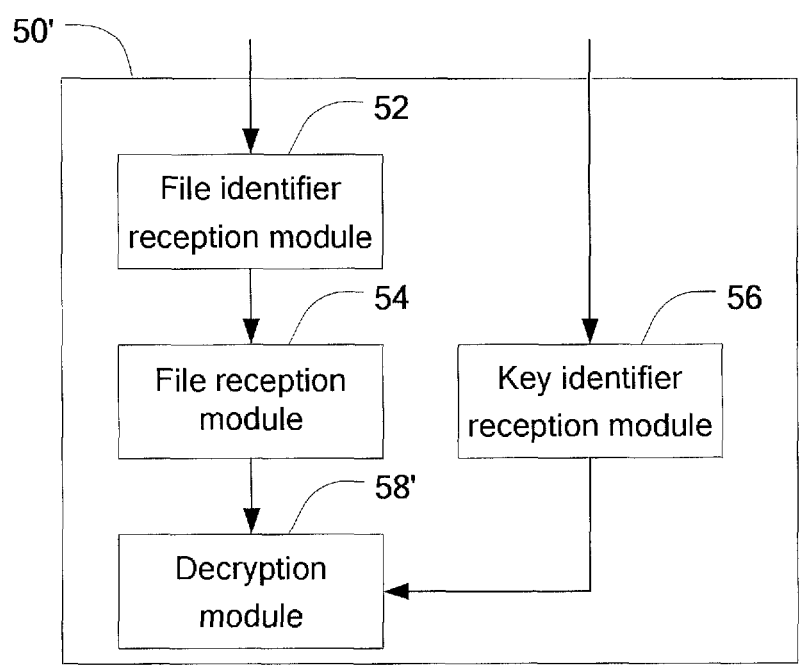
FIG. 7 illustrates a diagram of the structure of a device for decrypting a data file according to the second embodiment of the invention.

As illustrated in FIG. 7, a device 50' for decrypting a data file according to the second embodiment of the invention includes: a file identifier reception module 52 configured to receive a TOI value of a data file and a TOI value of a corresponding key file to be retrieved from an FDT generated by the device for generating description information 30'; a file reception module 54 configured to receive the corresponding data file and key file according to the data file TOI value and the key file TOT value; a key identifier reception module 56 configured to receive a key identifier corresponding to the data file; and a decryption module 58' configured to decrypt the data file according to the key file.

The decryption module 58' includes: a key extraction sub-module configured to extract a corresponding key from the key file according to the key identifier; and a decryption sub-module configured to decrypt the data file according to the key.

A user equipment intended to receive a data file with a TOI value of 2 locates and downloads the corresponding data file according to the TOI value and also downloads a key file with a TOI value of 8 corresponding to the data file according to a description in the FDT, extracts a corresponding key from the key file with the TOI value of 8 according to a received key identifier "BAFF=" and decrypts the data file using the key with the key identifier "BAFF=".

A data broadcast system according to the second embodiment of the invention includes: a description information generation device 30' further configured to generate file description information including an identifier of a data file, an identifier of a key file corresponding to the data file and a key identifier corresponding to the data file; and a data file decryption device 50' further configured to receive the data file identifier, the key file identifier and the key identifier in the file description information, to receive the corresponding data file and key file according to the data file identifier and the key file identifier, to extract a corresponding key from the key file according to the key identifier and to decrypt the data file according to the key.

According to the second embodiment, the key identifier corresponding to the data file is also added into the FDT in addition to the key file TOI, and thus in the case that the key file includes a plurality of keys, the user equipment can retrieve the key directly without parsing the data file in addition to its ability to locate the key file rapidly.

In a method for decrypting a data file according to a third embodiment of the invention, a user equipment can receive a corresponding key file according to a content location identifier (content-location value) in an FDT. However, since the user equipment shall receive a specific file from an FLUTE stream according to a TOI value, the user equipment receiving the content-location value of a key file shall further retrieve a TOT value of the key file from the FDT and receive the key file according to the TOI value.

Taking MBMS as an example, the device for generating description information generates the FDT file as shown below:

```
<FDT-Instance>
    <File
        Content-Type="application/sdp"
        TOI="2"
        KEY_FILE_Content-Location="key.bin"
        Content-Location="main.sdp">
    </File>
    <File
        Content-Type="application/mikey"
        TOI="8"
        Content-Location="key.bin"
    </File>
</FDT-Instance>
```

In the foregoing FDT file, as can be apparent from the first File section, the data file main.sdp has a TOI="2", where a key to encrypt the file main.sdp is carried in a file identified with KEY_FILE_Content-Location; and as can be apparent from the second File section, the key file key.bin has a TOI="8".

A method for decrypting a data file according to the third embodiment includes the following operations 12"-18".

In the operation 12", a user equipment receives a TOI value of a data file and a Content-Location value of a key file to decrypt the data file in an FDT;

In the operation 14", the user equipment searches the FDT table for a TOI value of the key file according to the Content-Location value of the key file;

In the operation 16", the corresponding data file and key file are received according to the TOI value of the data file and the TOI value of the key file; and In the operation 18", the data file is decrypted according to the key file.

When the key file includes a plurality of keys, the data file including a key identifier is parsed to retrieve the corresponding key identifier, then corresponding one of the keys is extracted from the key file according to the key identifier, and next the data file is decrypted with the key. For example, a statement "KEY_ID="BAFF="" descriptive of a key identifier is added in the foregoing FDT file, where the TOI value of the data file "main.sdp" is 2 and the Content-Location value of the corresponding key file is "key.bin", and the TOI value of the key file is 8 and the corresponding key identifier is "BAFF=".

According to the third embodiment of the invention, the TOI value of the data file and the Content-Location value of the key file to decrypt the data file are carried in the FDT so that the user equipment can receive the data file and the key file rapidly and obviate both a waste of resource due to reception of a large amount of useless information and also a time delay due to decryption of the data file to thereby improve a user's experience of a service.

It shall be noted that the foregoing embodiments are merely illustrative but not limitative of the invention and the invention will not be limited thereto but any technical solutions and adaptations thereof without departing from the scope of the invention shall be encompassed in the scope of the claims appended to the invention.

The invention claimed is:

1. A method for decrypting a data file, applicable in a data broadcast service and comprising:
   receiving file description information comprising an identifier of a data file and an identifier of a key file corresponding to the data file;
   receiving the data file and the key file according to the identifier of the data file and the identifier of the key file; and
   decrypting the data file according to the key file;
   wherein if the key file comprises one key corresponding to the data file, an operation of decrypting the data file according to the key file comprises:
   decrypting the data file according to the key in the key file; or
   if the key file comprises a plurality of keys, the file description information further comprises a key identifier corresponding to the data file, and the operation of decrypting the data file according to the key file comprises:
   receiving the key identifier;
   extracting corresponding one of the keys from the key file according to the key identifier;
   decrypting the data file using the key; or
   if the key file comprises a plurality of keys, the data file comprises a key identifier corresponding to the data file, and the operation of decrypting the data file according to the key file comprises:
   parsing the data file to extract the key identifier therein;
   extracting corresponding one of the keys from the key file according to the key identifier;
   decrypting the data file using the key.

2. The method for decrypting a data file according to claim 1, wherein the identifier of the data file and the identifier of the key file are a transport object identifier of the data file and a transport object identifier of the key file, respectively.

3. The method for decrypting a data file according to claim 1, wherein the identifier of the data file and the identifier of the key file are a transport object identifier of the data file and a content location identifier of the key file, respectively.

4. The method for decrypting a data file according to claim 3, wherein an operation of receiving the data file and the key file according to the identifier of the data file and the identifier of the key file comprises:
   searching the file description information for a transport object identifier of the key file according to the content location identifier of the key file; and
   receiving the data file and the key file according to the transport object identifier of the data file and the transport object identifier of the key file.

5. A device for decrypting a data file, applicable in a data broadcast service and comprising:
   a receiver configured to receive an identifier of a data file and an identifier of a corresponding key file to be retrieved from file description information and to receive the data file and the key file according to the identifier of the data file and the identifier of the key file, wherein if the key file comprises a plurality of keys, the file description information further comprises a key identifier corresponding to the data file, or the data file comprises a key identifier corresponding to the data file; and
   a processor configured to decrypt the data file according to the key in the key file if the key file comprises one key corresponding to the data file, or configured to extract corresponding one of the keys from the key file according to the key identifier included in the description information or included in the data file and decrypt the data file using the key if the key file comprises a plurality of keys.

6. A data broadcast system, comprising a description information generation device and the device for decrypting the data file according to claim 5:

wherein the description information generation device configured to generate file description information comprising an identifier of a data file and an identifier of a key file corresponding to the data file, or configured to generate file description information comprising an identifier of a data file, an identifier of a key file corresponding to the data file and a key identifier corresponding to the data file.

* * * * *